(12) United States Patent  
Jacobsen

(10) Patent No.: US 7,556,204 B2  
(45) Date of Patent: Jul. 7, 2009

(54) ELECTRONIC APPARATUS AND METHOD FOR SYMBOL INPUT

(75) Inventor: Niels Jacobsen, Dragor (DK)

(73) Assignee: Nokia corproation, Espoo (FI)

( * ) Notice: Subject to any disclaimer, the term of this patent is extended or adjusted under 35 U.S.C. 154(b) by 458 days.

(21) Appl. No.: 11/406,490

(22) Filed: Apr. 19, 2006

(65) Prior Publication Data

US 2007/0247436 A1 Oct. 25, 2007

(51) Int. Cl.
*G06K 7/10* (2006.01)

(52) U.S. Cl. .................. 235/472.01; 235/375; 235/439; 235/476

(58) Field of Classification Search ............ 235/472.01, 235/373, 376, 439, 444, 476; 345/173; 455/466; 715/835; 341/23; 710/1
See application file for complete search history.

(56) References Cited

U.S. PATENT DOCUMENTS 5,748,512 A  5/1998 Vargass
7,359,723 B2 * 4/2008 Jones ..................... 455/466

2004/0160419 A1  8/2004 Padgitt
2005/0154798 A1 * 7/2005 Nurmi ........................ 710/1

FOREIGN PATENT DOCUMENTS

CA   1200026 A1  1/1986
WO   9934574 A   7/1999

\* cited by examiner

*Primary Examiner*—Seung H Lee
(74) *Attorney, Agent, or Firm*—Perman & Green LLP

(57) ABSTRACT

An electronic apparatus having a user interface for symbol input is disclosed. The apparatus has a display and an input device having an elongated touch-sensitive sensor area and capable of detecting user actuations of a plurality of sensor positions along a main axis of the elongated touch-sensitive sensor area. The apparatus also has a processing device coupled to the display and the input device. In response to a user actuation of a current sensor position among said plurality of sensor positions of the input device, the processing device determines, from the current sensor position, a current symbol position in a symbol sequence, and then controls the display to indicate a current symbol held by the current symbol position in the symbol sequence.

17 Claims, 7 Drawing Sheets

ELECTRONIC APPARATUS AND METHOD FOR SYMBOL INPUT

FIELD OF THE INVENTION

The present invention relates to symbol input for electronic equipment, and more particularly to an electronic apparatus having a user interface for symbol input which involves a display and a touch-sensitive input device. The invention also relates to an associated method and computer program product for symbol input.

BACKGROUND OF THE INVENTION

Electronic equipment according to the above is often portable. A common example of a portable electronic apparatus is a mobile terminal having a wireless telecommunication interface to a mobile telecommunications network compliant with for instance GSM, UMTS, D-AMPS, CDMA2000, FOMA or TD-SCDMA. A typical mobile terminal 200 is shown in FIG. 2*a* in the form of a mobile phone. In a well known manner, this prior art mobile terminal 200 comprises a speaker or earphone 202, a microphone 205, a display 203 and a set of keys 204 which includes a 12-button keypad 204*a* of common ITU-T type (alpha-numerical keypad representing characters "0"-"9", "*" and "#"), and soft keys 204*b*, 204*c*. In addition, a joystick 211, or other type of navigational input device (e.g. scroll keys, touchpad, four/five-way navigation key, or rotator), is also provided. Other well known but not illustrated external components include volume control keys, power-on button, battery, charger interface and accessory interface.

Market demands have forced mobile terminals to become smaller and smaller. The 12-button ITU-T keypad is a limiting factor in this respect which restricts the design of mobile terminals, since it must have certain physical minimum dimensions in order to remain operable by the fingers of a human user.

On the other hand, the ITU-T keypad plays several important roles in modern mobile terminals and do not function only as a dialing keypad for manual entry of telephone numbers to call, but also as an alpha-numeric keyboard for text entry, as a game control for video games, etc. As regards text entry, each key in the ITU-T keypad often relates to several characters. A single key may, for instance, relate to the characters "a", "b" and "c". Pressing the key once produces the character "a", pressing the key twice within a short period of time produces the character "b", and pressing the key three times within a short period of time produces the character "c". Pressing the button twice slightly more slowly produces two "a":s. It is rather slow to use an ITU-T keypad in this a manner for character input; therefore, various methods for facilitating text entry with an ITU-T keypad have been developed. One well known example is T9 character prediction functionality.

The users of input mechanisms based on ITU-T keypad with character prediction functionality will have indirect access to the target character in the sense that they can press a key that represents 3-6 characters (e.g., "abc" on key "2"). This indirectness implies that a user will easily locate the target character. However, the prediction functionality has the negative effect that the user needs to validate the input on display—e.g., whether hitting the "2" key is interpreted as "a", "b" or "c". This is a negative aspect that typically requires time consuming user validation.

Attempts have been made to replace the relatively large ITU-T keypad with an alternative but much smaller input device. For instance, some prior art mobile phones use a mechanical rotator with character prediction functionality for character input. The rotator is typically used for navigating among a presented alphabetical character sequence with an appended set of prediction characters available for selection. While these devices have proven easy to learn for the users, experience nevertheless shows that even expert users will suffer from slow character input rates. The reasons for this are believed to include the following.

1) If the prediction characters do not match with the user's target character, the user has to potentially scroll many turns on the mechanical rotator to locate and find the target character in the alphabetical sequence; determining whether the target character is among the predicted characters and the many turns on the rotator are time consuming and slow down overall performance.

2) Each time the target character is found and highlighted—whether through the prediction characters or the alphabetical sequence—the user needs to lift his finger from the rotator and move it to a separate select key to select the highlighted character, and to continue the character input the finger needs to be moved back to the rotator. Both these finger movements are time consuming, and even for an expert user this time penalty cannot be compensated.

SUMMARY OF THE INVENTION

In view of the above, an objective of the invention is to solve or at least reduce the problems discussed above. In more particular, a purpose of the invention is to provide a user interface for an electronic apparatus that allows a smaller apparatus design with fewer elements involved in symbol input, where the symbol input is nonetheless fast, intuitive and accurate.

Generally, the above objectives and purposes are achieved by an electronic apparatus, and a method and a computer program product for symbol input in an electronic apparatus, according to the attached independent patent claims.

A first aspect of the invention is an electronic apparatus having a user interface for symbol input, the apparatus comprising:

a display;

an input device having an elongated touch-sensitive sensor area and capable of detecting user actuations of a plurality of sensor positions along a main axis of said elongated touch-sensitive sensor area; and a processing device coupled to said display and said input device, wherein the processing device, in response to a user actuation of a current sensor position among said plurality of sensor positions of said input device, is configured to:

determine, from said current sensor position, a current symbol position in a symbol sequence, and control said display to indicate a current symbol held by said current symbol position in said symbol sequence.

Advantageously, the processing device is configured to control said display for presentment of said symbol sequence in a predetermined and fixed order, and to control said display to indicate said current symbol held by said current symbol position by marking it as available for selection.

By "presentment of said symbol sequence in a predetermined and fixed order" is meant that the symbol sequence is shown statically in an area of the display without changes in contents, order or position at least between two subsequent symbol inputs.

This means that the user may conveniently use the elongated touch-sensitive sensor area of the input device as a means for navigating among the various symbols of the presented symbol sequence, where the symbols have a fixed order which is well known to the user and therefore facilitates quick and accurate symbol navigation by actuation of the elongated touch-sensitive sensor area at desired sensor positions.

For instance, in an embodiment where the symbol sequence contains linguistic symbols such as Latin characters (e.g. "A" to "Z", "a" to "z", or a subset thereof), the predetermined and fixed order may be alphabetical. Correspondingly, when the symbol sequence contains Arabic numerals (e.g. "0" to "9", or a subset thereof), the predetermined and fixed order may be numerical. Some embodiments may relate to other types of symbol sequences, including but not limited to punctuation symbols ("special characters"), Cyrillic characters, Chinese characters, Japanese Kanji symbols, Japanese Hiragana characters or Japanese Katakana characters, wherein the predetermined and fixed order may be an order which is typical and natural for the symbol set or language in question.

In some embodiments, the entire symbol sequence, or individual symbols therein, may be in the form of icons, etc, representing selectable actions in the user interface rather than linguistic symbols. Combinational embodiments are also conceived, where one and the same symbol sequence contains both linguistic symbols and user interface actions. In one such embodiment, one symbol in the symbol sequence serves for switching between different symbol sets, such as between Latin upper case, Latin lower case, Arabic numerals or special characters.

In some embodiments, the symbol sequence is hierarchically arranged, such that some symbols may represent nodes (like folders or catalogs in a file system or menu system), whereas other symbols may represent leaves (like files or menu items, or individual characters).

Marking "said current symbol held by said current symbol position" "as available for selection" may e.g. involve highlighting said current symbol or otherwise momentarily give it a visual appearance distinctly different from other symbols in the presented symbol sequence.

A display area of said display may located at a surface of an apparatus housing of said apparatus, adjacent to the elongated touch-sensitive sensor area of said input device. The symbol sequence may be presented near a border of said display area adjacent to and in alignment with the main axis of said elongated touch-sensitive sensor area, such that the sensor positions of the sensor area are aligned with respective ones of said symbol positions of the presented symbol sequence.

In some embodiments, both the display and the elongated touch-sensitive sensor area are provided in or at a front surface of the apparatus housing. More particularly, in one embodiment the sensor area is located closely outside a rightmost border portion of the display (as viewed by a typical user when holding a portable electronic apparatus in a typical operating position). Such an arrangement is beneficial particularly for a right-handed user, since it will allow him to use the apparatus with a one-handed grip, the fingers of the hand holding the apparatus and the thumb of the hand scrolling up and down along the main axis of the touch-sensitive sensor area so as to actuate it at desired sensor positions by depressing with the thumb.

An embodiment particularly suited for left-handed users may instead have the elongated touch-sensitive sensor area provided closely to the left of the display. Embodiments which are particularly suitable both for right-handed and for left-handed users may have dual sensor areas, one to the left of the display and one to the right. Alternatively or additionally, the or one elongated touch-sensitive sensor area may be located near a lowermost border portion of the display.

The input device may conveniently be implemented by a touch-sensitive sensor selected from the group consisting of: a resistive touch-sensitive sensor, a capacitive touch-sensitive sensor, an acoustic wave sensor, an accelerometer sensor, an optical (e.g. infrared) sensor, an electromechanical sensor, an electromagnetic sensor, or any combination of the above.

In case of for instance a capacitive or resistive touch-sensitive sensor, its sensor area may be sensitive to actuations in a large number of sensor points in an elongated two-dimensional sensor matrix. In such a case, the elongated two-dimensional sensor matrix may be logically divided into consecutive sub areas along the main axis, each sub area forming one sensor position. In other words, all actuations of a sensor point within a particular sub area of the sensor matrix will represent one particular sensor position, which in turn will represent one symbol position in aforesaid symbol sequence.

On the other hand, in case of for instance an electromechanical sensor implemented as an array of collapsible domes underneath a flexible surface (much like the structure which is typically used in commonplace key mats e.g. for ITU-T-type keypads), there may be a one-to-one relation between the collapsible domes and the sensor positions (one particular dome will represent one particular sensor position).

In an alternative embodiment, the input device and the display are jointly implemented by a touch-sensitive display, said elongated touch-sensitive sensor area of the input device being implemented by a particular display sub area of the touch-sensitive display.

The processing device may be further configured to detect the occurrence of a selective event on said touch-sensitive sensor area of the input device, and in response cause selection of said marked symbol as a current input symbol.

Thus, since the touch-sensitive area is used both for navigation among the available symbols and for selection of them, the need for a separate select key, etc, is avoided. This arrangement has benefits in that it saves components and therefore costs, in that it allows a compact apparatus shape, in that it allows quick and accurate input, and in that it further facilitates one-handed use.

In an embodiment where aforesaid user actuation involves a certain force of actuation by the user onto said touch-sensitive sensor area, the selective event may be detected as a further user actuation of said touch-sensitive sensor area, the further user actuation involving a larger force of actuation than said certain force of actuation.

Thus, the user may depress the touch-sensitive sensor area at the desired sensor position, using a certain force, so as to mark the desired symbol, and then make the selection of the desired symbol by pressing harder on the touch-sensitive sensor area, without suspending the engagement with the touch-sensitive sensor area in the meantime.

In an alternative embodiment, the user may instead command selection in a "point and click" manner, i.e. by lifting the thumb (etc) after marking of the desired symbol and then quickly reapplying the depression by the thumb so as to perform the selection.

In yet an alternative embodiment, the processing device may cause the selection by detecting the lapse of a predetermined timeout period of maintained engagement with the touch-sensitive sensor area without movement of the thumb (etc). Thus, in this alternative embodiment, the user will mark the desired symbol by touching the touch-sensitive sensor area with the thumb (etc), and then keep the thumb steady for a certain time, wherein the processing device will automatically cause the selection.

Where each sensor position among said plurality of sensor positions is associated with a respective symbol position in said symbol sequence, the processing device may be configured to determine said current symbol position from said current sensor position by choosing a symbol position with which said current sensor position is associated.

Thus, in such an embodiment, the current symbol which is marked for selection will be the symbol whose associated sensor position is closest to the point of actuation on the touch-sensitive sensor area.

In an advantageous embodiment, the processing device has access to symbol prediction functionality and is configured to determine said current symbol by:

determining a candidate symbol held by a symbol position with which said current sensor position is associated;

selecting a range of symbols from said symbol sequence, said range including said candidate symbol;

determining a most probable next input symbol in said range of symbols by applying the symbol prediction functionality;

and choosing said most probable next input symbol as said current symbol.

The symbol prediction functionality may operate on at least one recent input symbol in consideration of a prefix or word based stochastic language model.

This embodiment provides symbol prediction functionality which improves the accuracy of the user's highlighting of a desired symbol to be marked for selection. If the user accidentally misses the correct sensor position and instead actuates one in the vicinity thereof, the symbol prediction functionality will assist him in a transparent manner, so that a more likely symbol than the one that corresponds to the accidentally actuated sensor position will be highlighted instead.

Sometimes, when the user correctly hits an intended sensor position which represents a less likely symbol, the symbol prediction functionality may unfavorably contravene the user's intention and automatically change the highlighting to an adjacent symbol, statistically more likely but not the intended one in the particular case. However, statistically speaking the opposite situation will be more frequent; where the symbol prediction functionality will favorably change the highlighting from an unintentional and less likely symbol to an adjacent more likely one. Therefore, this embodiment will increase the average "hit rate" of the highlighting in a transparent way, so that the user will not notice the symbol prediction functionality as something separate but will simply feel that he performs surprisingly well.

The stochastic language model of the symbol prediction functionality may for instance be based on statistical n-gram (e.g. monogram, bigram or trigram) data, against which a current n-gram—comprised by the (n−1) most recent input symbols appended by a respective one of the symbols from the range of symbols—is evaluated to find the most probable next input symbol. Alternatively, the stochastic language model may be based on entire words.

The range of symbols may be selected to include m neighboring symbols on either sides of the candidate symbol in the symbol sequence, where m may be for instance 1, 2 or 3. Weighting may be applied so that a first order neighboring symbol (e.g. "B" or "D", if the candidate symbol is "C") is favored over a second order neighboring symbol (e.g. "A" or "E"), and so on, when determining the most probable next input symbol. Weighting may also be applied so that the most probable next input symbol must outperform the candidate symbol in terms of probability by a certain margin in order to replace the candidate symbol as current symbol.

In one embodiment, the processing device is configured to detect a first user actuation of a first sensor position of said input device, determine from the first sensor position a first symbol position holding a first symbol, and control the display to mark the first symbol as available for selection, wherein the processing device is further configured to detect a second user actuation of said input device, determine from said first symbol position and said second user actuation a second symbol position holding a second symbol, and control the display to mark the second symbol as available for selection instead of the first symbol.

In one embodiment, the first user actuation involves engaging with the touch-sensitive sensor area at said first sensor position, wherein the second user actuation involves moving with maintained engagement along said main axis to a second sensor position from which said second symbol position is determined.

This arrangement allows the user to perform "click & scroll" operations by touching the sensor area at the first sensor position and then, when it has been highlighted or otherwise marked, drag along the sensor area towards the desired second position, the highlighting changing automatically from the first symbol to the second symbol (and advantageously also between symbols represented by intermediate sensor positions during the dragging movement, thereby giving the user feedback in the form of a scrolling sensation).

In an embodiment where each sensor position among said plurality of sensor positions is associated with a respective symbol position in said symbol sequence, the processing device may be provided with symbol prediction functionality and be configured to determine said second symbol by:

determining a candidate symbol held by a symbol position with which said second sensor position is associated;

selecting a range of symbols from said symbol sequence, said range including said candidate symbol;

determining a most probable next input symbol in said range of symbols by applying the symbol prediction functionality;

and choosing said most probable next input symbol as said second symbol.

The symbol prediction functionality may operate as has already been described above. In addition, when the symbol prediction functionality is applied after scrolling, the velocity of the movement from the first sensor position to the second sensor position may be taken into account.

It is particularly useful to apply the symbol prediction functionality when the velocity of movement is high, since this means that the user makes a rapid movement which for obvious biomechanical reasons will be very difficult for him to control accurately. For rapid movements on the elongated sensor area, the user will often end at a second sensor position which is different from the intended one, and the symbol prediction functionality will contribute strongly to improved navigation accuracy.

On the other hand, for slow movements on the elongated sensor area, the symbol prediction functionality may be dispensed with, thereby giving the user an opportunity for a fine-tuned navigation to exactly the intended second sensor position, even if the second symbol represented by it is a less likely symbol.

The elongated touch-sensitive sensor area of said input device may be provided as a touch rail in or at said surface of said apparatus housing adjacent to said display and have a visual appearance which is indifferent from surrounding parts of said surface.

Making the touch rail invisible or at least indistinct compared to the surrounding apparatus housing surface will allow more freedom in the industrial design of the apparatus. Placing the touch rail in close proximity of the display will enhance usability in terms of ergonomics and eye/hand coordination.

The invention is particularly useful for portable equipment. Therefore, the electronic apparatus may advantageously be portable. Moreover, it may comprise a wireless telecommunication interface to a mobile telecommunications network. Therefore, the invention may advantageously be implemented in or as a mobile terminal with a wireless telecommunication interface to a mobile telecommunications network which may be in compliance with any commercially available mobile telecommunications standard, including but not limited to GSM, UMTS, D-AMPS, CDMA2000, FOMA and TD-SCDMA.

Other embodiments may involve other types of portable electronic apparatuses, including but not limited to a remote control device, a portable music player, a personal digital assistant (PDA), a hand-held (palmtop) computer, a GPS navigator, etc. Still other embodiments may involve stationary electronic apparatuses such as a car navigation system, a CD or DVD player, a television set, a stationary telephone, a facsimile machine, a printer, etc.

Hence, according to the first aspect of the invention, a portable electronic apparatus, for instance a mobile terminal, may be designed without a traditional numeric or alphanumeric character keyboard, such as a 12-key ITU-T keypad, and yet provide manual input options like text entry as well as number entry (e.g. manual dialing of telephone numbers to call). This has important advantages, since it allows greater freedom when designing the apparatus, facilitates miniaturization of the apparatus and permits realization with fewer components for manual input (i.e. a potential cost benefit). Furthermore, user input is provided in an intuitive manner which makes space-efficient use of the available display area.

A second aspect of the invention is a method for symbol input in an electronic apparatus having a display, the method involving:

providing an input device having an elongated touch-sensitive sensor area and capable of detecting user actuations of a plurality of sensor positions along a main axis of said elongated touch-sensitive sensor area;

detecting a user actuation of a current sensor position among said plurality of sensor positions;

determining, from said current sensor position, a current symbol position in a symbol sequence; and indicating on said display a current symbol held by said current symbol position in said symbol sequence.

The method of the second aspect may furthermore contain any of the functional features defined above for the first aspect of the invention.

A third aspect of the invention is an electronic apparatus for symbol input, the apparatus comprising:

means for detecting user actuations of a plurality of sensor positions along a main axis of an elongated touch-sensitive sensor area;

means for detecting a user actuation of a current sensor position among said plurality of sensor positions;

means for determining, from said current sensor position, a current symbol position in a symbol sequence; and means for indicating a current symbol held by said current symbol position in said symbol sequence.

The electronic apparatus of the third aspect may furthermore contain means for performing any of the functional features defined above for the first aspect of the invention.

A fourth aspect of the invention is a computer program product comprising machine-readable instructions which, when executed by a processor, perform the steps of detecting a user actuation of a current sensor position among a plurality of sensor positions along a main axis of an elongated touch-sensitive sensor area of an input device;

determining, from said current sensor position, a current symbol position in a symbol sequence; and indicating, on a display, a current symbol held by said current symbol position in said symbol sequence.

The computer program product of the fourth aspect may furthermore contain machine-readable instructions which, when executed by the processor, perform any of the functional features defined above for the first aspect of the invention. Furthermore, the computer program product may advantageously be executed by the processing device of the electronic apparatus according to the first aspect.

Other aspects, objectives, features and advantages of the present invention will appear from the following detailed disclosure, from the attached dependent claims as well as from the drawings.

BRIEF DESCRIPTION OF THE DRAWINGS

The present invention will now be described in more detail, reference being made to the enclosed drawings, in which.

DETAILED DESCRIPTION OF THE INVENTION

Figure 1:
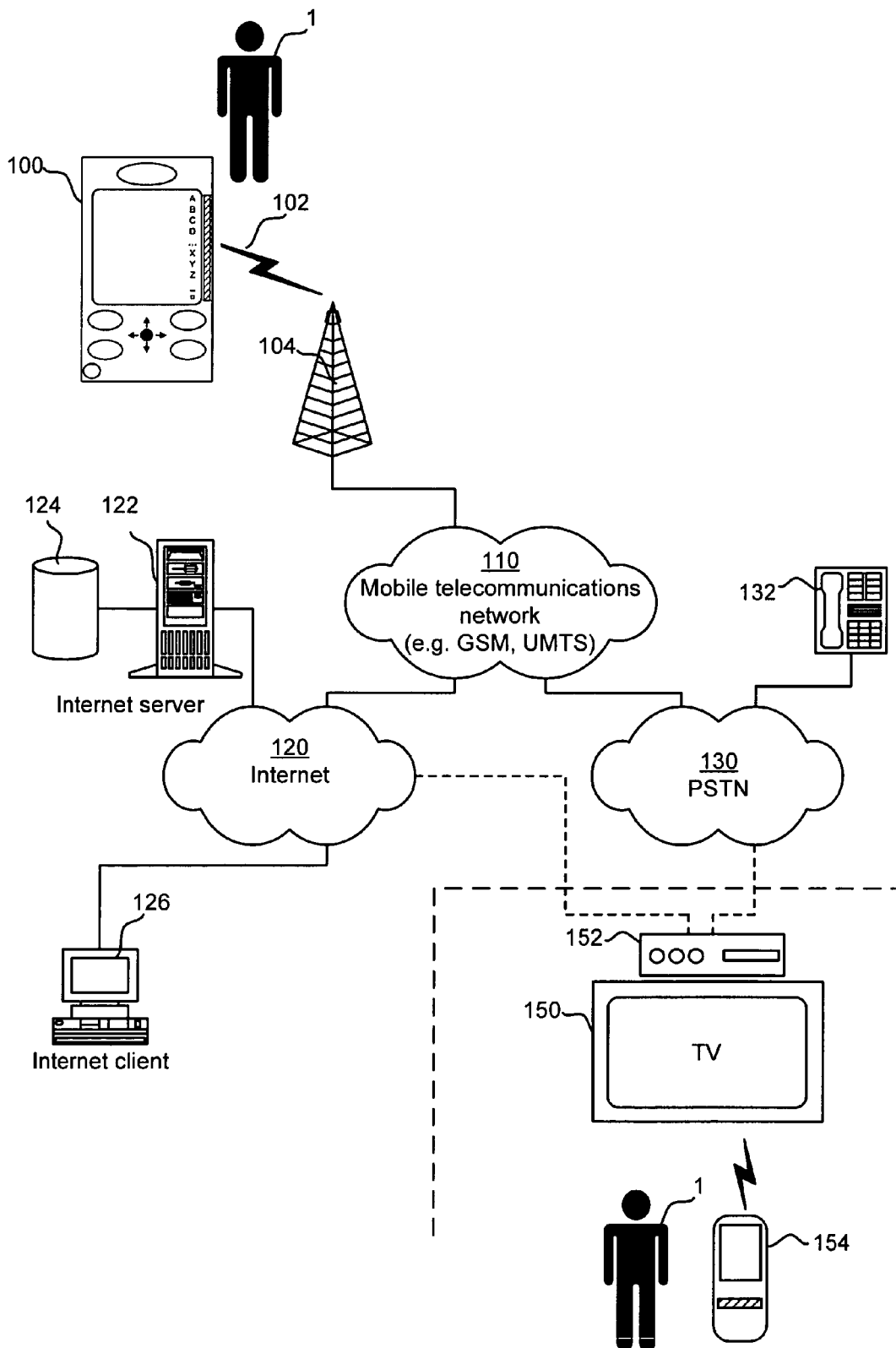
FIG. 1 is a schematic illustration of different typical but non-limiting examples of environments in which different embodiments of the electronic apparatus of the invention may be exercised, where one embodiment is a mobile terminal and another embodiment is a remote control device.

FIG. 1 illustrates, in a non-limiting manner, two examples of environments in which different embodiments of the electronic apparatus may be used for symbol input. The embodiments of FIG. 1 are both portable, but, as has already been explained, the invention may also be applied to stationary equipment.

The first embodiment is a mobile terminal 100 which is part of a cellular telecommunications system. In the telecommunication system of FIG. 1, various telecommunications services such as cellular voice calls, www wap browsing, cellular video calls, data calls, facsimile transmissions, still image transmissions, video transmissions, electronic message transmissions and electronic commerce may be performed between the mobile terminal 100 and other devices, such as another mobile terminal or stationary telephone 132. It is to be noted that for different embodiments of the mobile terminal 100 and in different situations, different ones of the telecommunications services referred to above may or may not be available; the invention is not limited to any particular set of services in this respect.

The mobile terminal 100 is connected to a mobile telecommunications network 110 through an RF link 102 via a base station 104. The mobile terminal 100 and the mobile telecommunications network 110 may be in compliance with any commercially available mobile telecommunications standard, including but not limited to GSM, UMTS, D-AMPS, CDMA2000, FOMA and TD-SCDMA. The external and internal parts of the mobile terminal 100 will be described in more detail below with reference to FIGS. 2b and 3.

A public switched telephone network (PSTN) 130 is connected to the mobile telecommunications network 110 in a familiar manner. Various telephone terminals, including the abovementioned stationary telephone 132, are connected to the PSTN 130.

The mobile telecommunications network 110 is operatively connected to a wide area network 120, which may be Internet or a part thereof. An Internet server 122 has a data storage 124 and is connected to the wide area network 120, as is an Internet client computer 126. The server 122 with its data storage 124 may host a www/wap server capable of serving www/wap content to the mobile terminal 100.

The system illustrated in FIG. 1 serves exemplifying purposes only.

The mobile terminal 100 of the first embodiment may be used for symbol input in various situations and for various purposes, such as for controlling any of the telecommunication services referred to above. The rest of this description will relate, as a non-limiting example, to symbol input in the form of character entries to form a text message in a symbol-handling software application 350 (FIG. 3) in the mobile terminal.

First, however, the second embodiment 154 of a portable electronic apparatus for symbol input will be briefly referred to. The second embodiment is a remote control device 154 having a simple user interface in the form of a display and touch rail for symbol input. The user 1 may use the remote control device 154 so as to control a television set 150, digital receiver 152 and or various services which are accessible via for instance the Internet 120 or the PSTN 130. To this end, the user 1 will actuate the touch rail to navigate and select among a plurality of available symbols presented as e.g. characters or icons on the display, in much the same manner as will be described in more detail later for the mobile terminal 100/200' of the first embodiment.

Figure 2A:
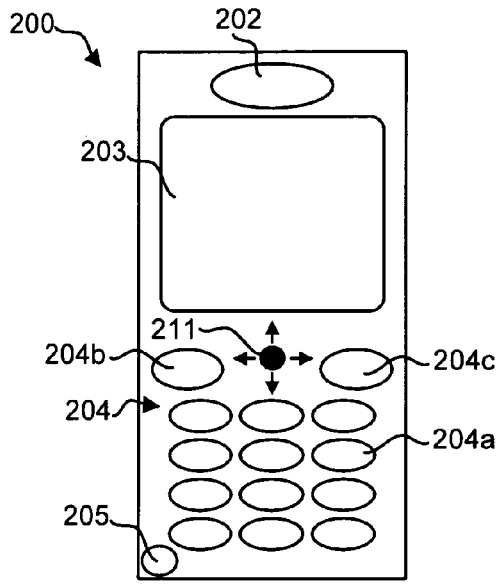
FIG. 2*a* is a schematic front view illustrating a mobile terminal according to the prior art.
Figure 2B:
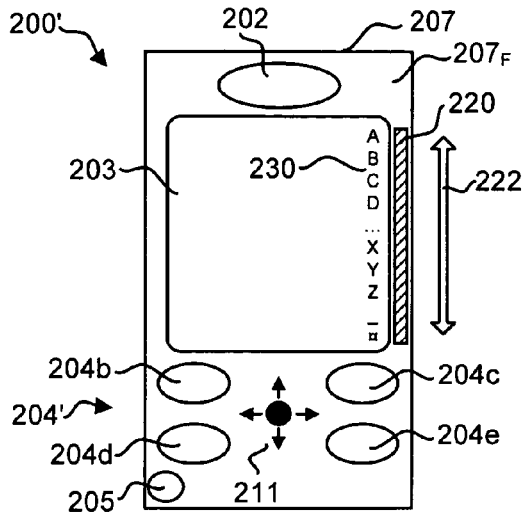
FIG. 2*b* is a schematic front view illustrating the mobile terminal of FIG. 1 in more detail, showing its user interface which involves a display and an elongated touch-sensitive sensor area, or touch rail, for symbol input.

Therefore, referring back to the first embodiment, the mobile terminal thereof is illustrated in more detail as 200' in FIG. 2b. Externally, the mobile terminal 200' has an apparatus housing 207 which contains a speaker or earphone 202, a microphone 205, a display 203 and a set of keys 204'. In contrast to the prior art terminal 200 of FIG. 2a, no ITU-T type keypad is necessary and may therefore be dispensed with. The set of keys 204' for the mobile terminal 200' therefore only has a limited number of keys 204b-204e.

These keys 204' may include left and right soft keys 204b and 204c, a Send key 204d (corresponding to Call/-Yes/OK on various existing telephone models) and an End key 204e (corresponding to Hangup/No/Cancel). Alternatively or additionally, the keys 204' may include a clear key (for actions such as backspace, escape etc), an application key (allowing the user to toggle between applications and items in a menu-based main application menu), and an alpha key (for use in some applications for changing dictionaries and performing multiple selection actions). As will be appreciated by a man skilled in the art, the keys 204' will be assigned different functions or actions in different situations in the user interface.

A joystick 211 or other type of navigational input device, such as a four/five-way navigation key, may also be provided. Additionally, other well known external components may be present, such as volume control keys, power-on button, battery, charger interface and accessory interface.

As a means for symbol input, the mobile terminal 200' has an input device with an elongated touch-sensitive sensor area 220, referred to as touch rail in the following.

In the present embodiment, the touch rail 220 has the form of an elongated touch-sensitive sensor area having dimensions 41 mm×2 mm=82 mm$^2$ and being based on resistive touch sensor technology which is pressure-sensitive. Therefore, the touch rail 220 is capable not only of detecting actuations among a large number of sensor points in the touch-sensitive sensor area, but also to detect different application forces, at least such that it can differentiate between a stronger depression and a weaker depression at any of the sensor points. Such pressure-sensitive resistive touch sensor technology is commercially available from different sources, as is well known per se to the skilled person.

Figure 2C:
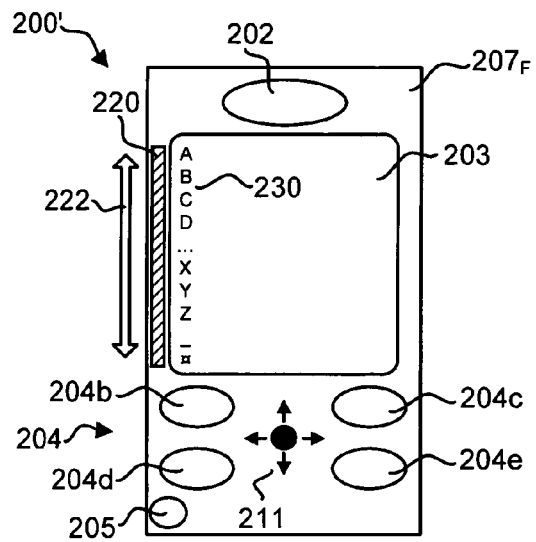
FIGS. 2*c*-2*e* illustrate alternative embodiments of the mobile terminal of FIG. 1.
Figure 2D:
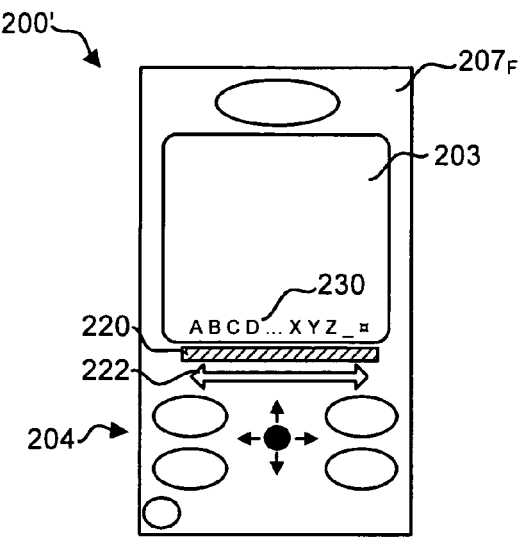
Figure 2E:
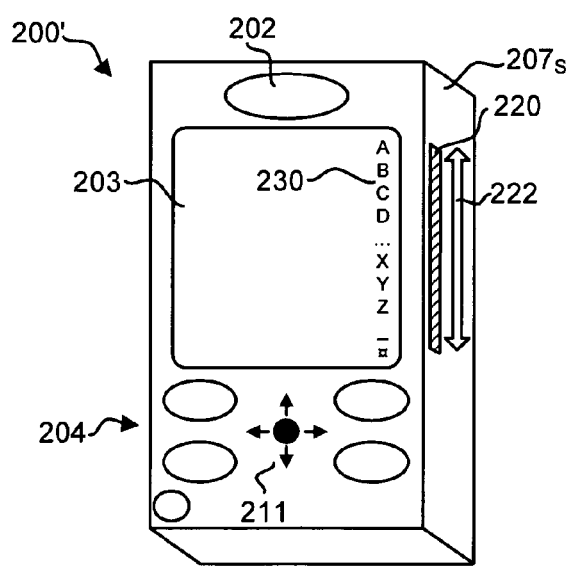

In the embodiment of FIG. 2b, the touch rail 220 is located adjacent to a rightmost border part of the display 203 at a front surface $207_F$ of the apparatus housing 207. In the alternative embodiments shown in FIGS. 2c, 2d and 2e, the touch rail 220 is located to the left of the display 203 at the front surface $207_F$, below the display 203 at the front surface $207_F$, and near the display 203 but at a short-side surface $207_S$, respectively. As has already been explained, different ones of these arrangements are particularly suitable for one-handed use by right-handed and left-handed users.

As will be apparent from the use case illustrated further below with reference to FIGS. 5a-5j, the touch rail will be used by the user 1 to navigate and select among available symbols in a symbol sequence 230 by depressing the touch rail at desired sensor positions. Advantageously, the user 1 may hold the mobile terminal 200' in one hand and actuate the touch rail 220 as desired by moving his thumb in opposite directions 222 along a main axis of the touch rail 220. Also see the description of FIGS. 4a-4b below for further details.

It is to be noticed that the introduction of the touch rail 220 instead of a conventional input device like an ITU-T type keypad makes valuable space savings on the front surface $207_F$ of the apparatus housing 207. In the embodiment of FIG. 2b, these space savings are used both for reducing the size of the apparatus housing 207 compared to the prior art terminal 200 of FIG. 2a, and for increasing the size of the display 203 versus the total front surface $207_F$.

Figure 3:
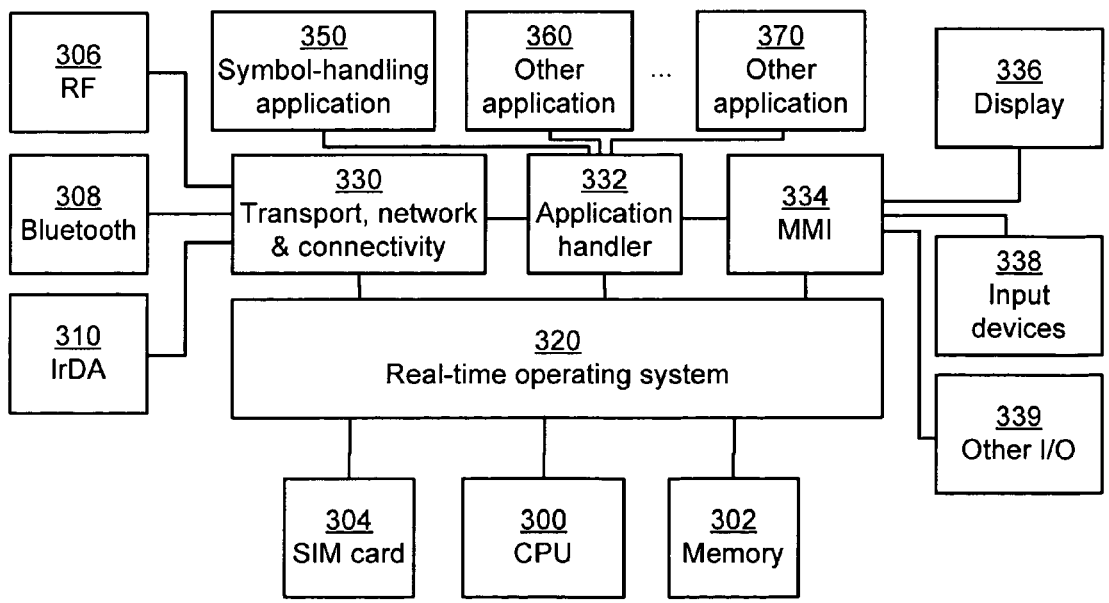
FIG. 3 is a schematic block diagram representing an internal component, software and protocol structure of the mobile terminal shown in FIG. 2*b*.

The internal component, software and protocol structure of the mobile terminal 200' will now be described with reference to FIG. 3. The mobile terminal has a processing device or controller 300 which is responsible for the overall operation of the mobile terminal and which may be implemented by any commercially available CPU ("Central Processing Unit") or DSP ("Digital Signal Processor"), or alternatively by any other electronic programmable logic device such as an ASIC ("Application-Specific Integrated Circuit"). The processing device 300 has associated electronic memory 302 such as RAM memory, ROM memory, EEPROM memory, flash memory, hard disk, or any combination thereof. The memory 302 is used for various purposes by the processing device 300, one of them being for storing data and program instructions for various software in the mobile terminal.

The software includes a real-time operating system 320, drivers for a man-machine interface (MMI) 334, an application handler 332 as well as various applications. The applications include the aforementioned symbol-handling application 350, as well as various other applications 360 and 370. In the disclosed embodiment, the symbol-handling application 350 is an application capable of accepting character input from the user 1, such as a messaging application (e.g. SMS, MMS, email or Instant Messaging), a phonebook application, a WAP WWW browser, a calendar application, a word processing application, a notepad application, a call handling application accepting manual dialing of a telephone number to call, a calculator, or any other application which uses at least one field for text, character, digit or symbol input.

The MMI 334 also includes one or more hardware controllers, which together with the MMI drivers cooperate with the display 336/203, the touch rail 220, keys 204' and joystick 211 (commonly referred to as input devices 338 in FIG. 3), as well as various other I/O devices 339 such as the microphone 205, the speaker 337/202, a vibrator, a ringtone generator, an LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, inter alia, band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4A:
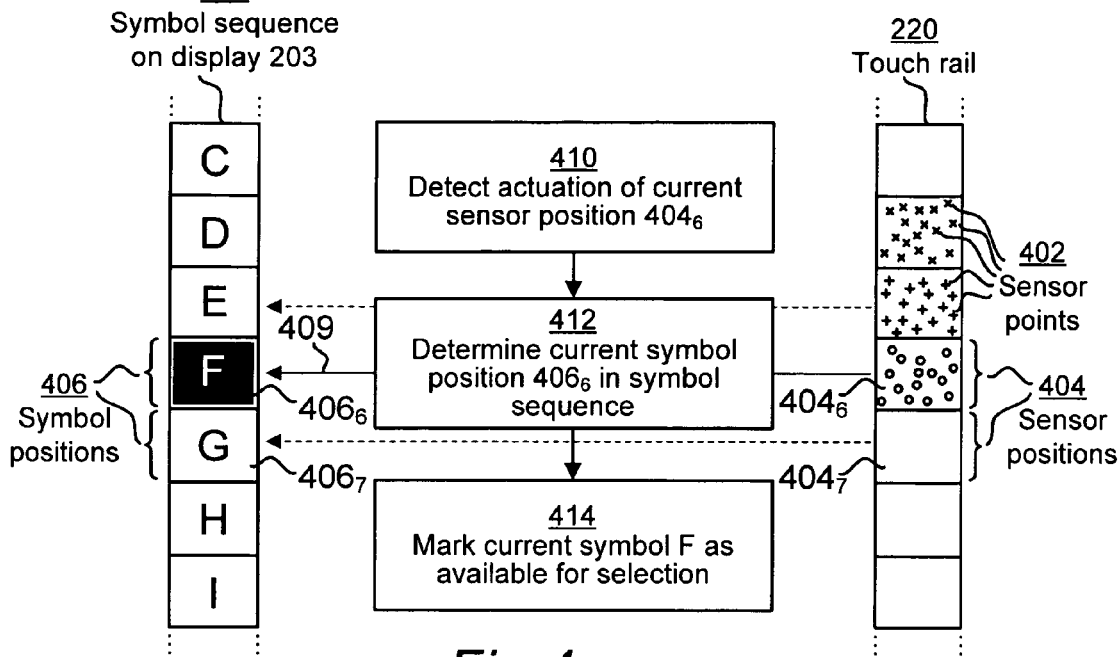
FIGS. 4*a*-4*b* are diagrams that illustrate first and second embodiments of a method of inputting symbols to a symbol-handling software application in the mobile terminal of FIG. 2*b*.

Reference is now made to FIG. 4a which illustrates a method of inputting symbols to a symbol-handling software application in the mobile terminal of FIG. 2b. As seen in FIG. 4a, the touch rail is divided into a consecutive sequence of logical sensor positions 404. Each logical sensor position 404 has a plurality of physical touch-sensitive sensor points 402. Activation of any such sensor point 402 in a particular sensor position 404 will be interpreted, by the touch rail 220 itself or the processing device 300, as actuation of that particular sensor position 404.

In FIG. 4a, the symbol sequence 230 is presented by the processing device 300 on the display 203 as a vertical list of Latin characters in alphabetical order. Thus, each character . . . , C, D, E, . . . holds a respective symbol position 406. For the convenience of the user 1, the symbol positions 406 are horizontally aligned with the sensor positions 404, so that the character list 230 will serve as a legend that explains the meaning of each sensor position to the user 1 and so that each sensor position 404 will be associated with a respective symbol position 406. It is to be noticed that the boundaries of each sensor position need not be visible in reality; they are shown in FIG. 4a for educational purposes. Moreover, it is to be noticed that in reality, the character list will preferably be shown much closer to the touch rail 220.

In a step 410, the processing device 300 detects actuation of a current sensor position $404_6$. In step 412, the particular current symbol position $406_6$ in the character list 230 is determined which is associated with the current sensor position $404_6$. Then, in step 414 the symbol F held by the thus determined current symbol position $406_6$ is marked as available for selection by highlighting it.

As seen by horizontal arrows 409 in FIG. 4a, in this embodiment, actuation of a certain sensor position 404 will always cause marking of the same corresponding symbol position 406.

The user 1 may select a marked symbol by depressing the touch rail slightly harder. He may also maintain the depression at the original pressure level and slide his thumb up or down on the touch rail 220, thereby causing scrolling in the character list 230 by accordingly changing the highlight to preceding or following characters in the character list 230. When arriving at the desired target symbol position 406, he may select the symbol by depressing slightly harder on the touch rail 220. Alternatively, he may have another character highlighted by lifting his thumb and then reapplying it at the desired sensor position 404.

Figure 4B:
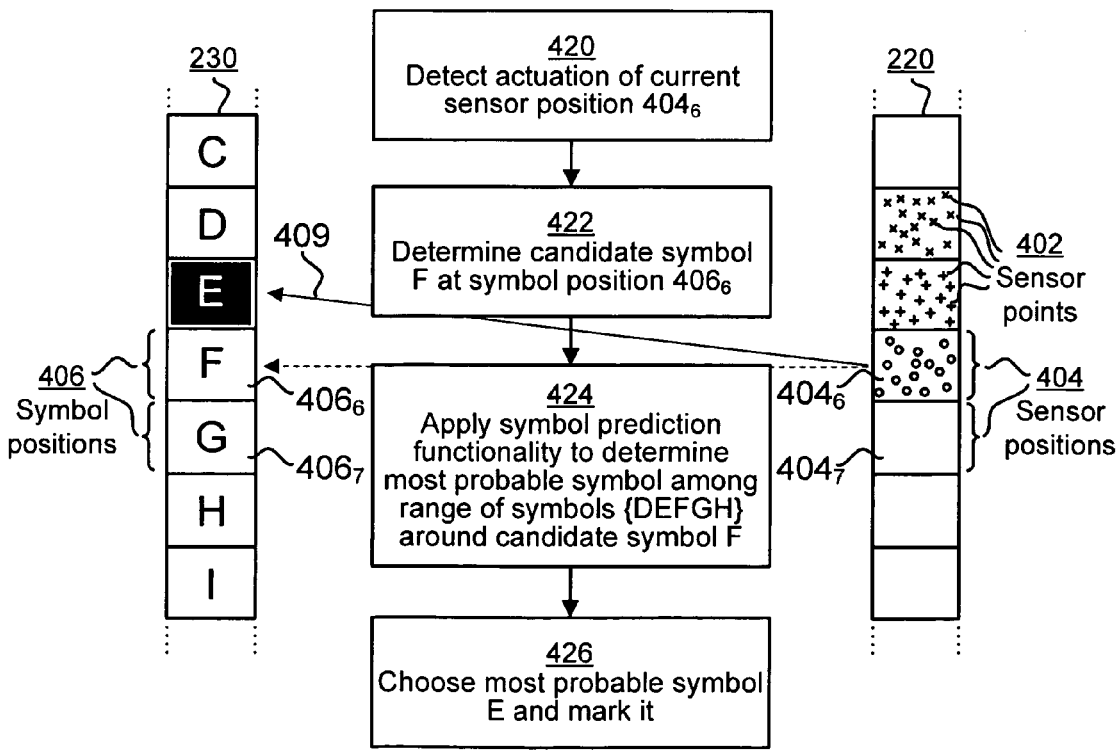

The embodiment of FIG. 4b uses symbol prediction functionality which will transparently assist the user when trying to actuate the touch rail 220 at the correct sensor positions 404. In step 420, actuation of a current sensor position $404_6$ is detected as in aforementioned step 410. Then, in step 422 a candidate symbol F is determined as the symbol held by the symbol position $406_6$ associated with the current sensor position $404_6$.

Then, the processing device 300 proceeds to step 424 where symbol prediction functionality is applied to determine a most probable symbol. This step involves choosing a range of symbols that includes the candidate symbol F. In the present embodiment, the range of symbols is chosen as the two closest neighbor symbols above and below the candidate symbol, together with the candidate symbol itself. Thus, in the present example, {DEFGH} are chosen as range of symbols. Out of this range, the symbol prediction functionality determines the most probable next symbol, preferably taking into consideration also recent input symbol(s), as has already been explained in a previous section of this document.

Finally, the most probable symbol E is marked by the processing device 300 as available for selection in step 426.

The symbol prediction functionality may be included in said set of MMI drivers 334, or it may be provided as separate software executable by the processing device 300. In other embodiments it may even be realized partly or entirely in hardware, for instance in the form of an ASIC.

A use case will now be presented with reference to FIGS. 5a to 5j. The use case concerns inputting a short text message, "Hi world", by using the touch rail 220 of the mobile terminal 200' with the embodiment explained above for FIG. 4b (with symbol prediction functionality).

Figure 5A:
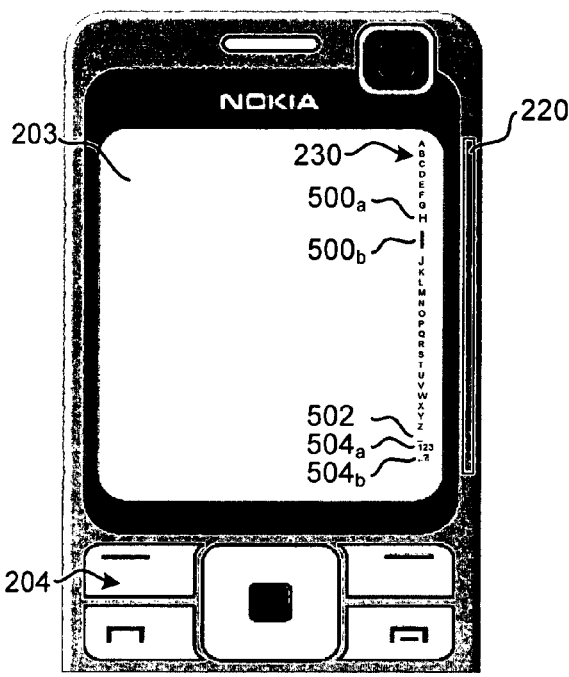
FIGS. 5*a* to 5*j* illustrate screenshots of a display of the mobile terminal, taken during input of a short text message by a mobile terminal provided with a touch rail.

As seen in FIG. 5a, the character list 230 is shown vertically in the rightmost part of the display 203. The character list 230 includes the full alphabet as well as a space symbol 502 and mode switch symbols $504_a$ and $504_b$. Selection of symbol $504_a$ will cause the processing device 300 to change the list 230 to a numeric list, containing e.g. digits "0" through "9" as well as mathematical operators, etc. Selection of symbol $504_b$ will cause the processing device 300 to change to a special symbol list, containing for instance punctuation symbols or non-Latin characters.

In FIG. 5a, the user wants to move his thumb to the touch rail sub area (sensor position) representing "H" (symbol position $500_a$) but accidentally touches the sub area next to "I".

"I" and "H" are held equally likely by the symbol prediction functionality, and "I" is highlighted as seen at $500_b$.

Figure 5B:
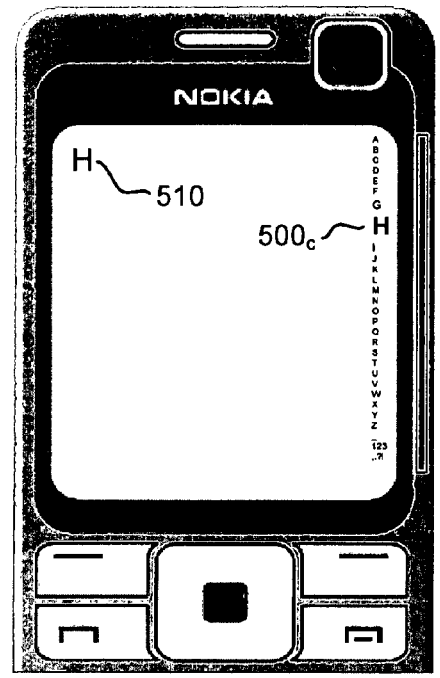

In FIG. 5b, maintaining his engagement with the touch rail 220, the user moves his thumb slightly upwards, making "H" the highlighted character as seen at $500_c$. The user depresses the touch rail 220 slightly harder, and "H" is shown at 510 on the display 203.

Figure 5C:
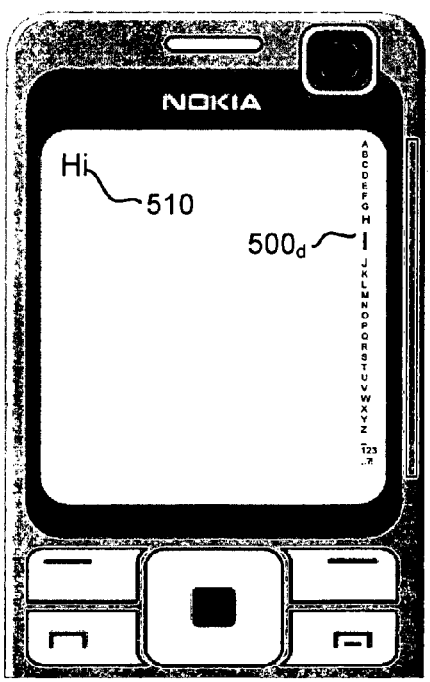

In FIG. 5c, still maintaining his engagement with the touch rail 220, the user moves his thumb slightly down-wards to highlight the character "I", as seen at $500_d$. The user depresses the touch rail 220 slightly harder, and "I" is added to the text shown at 510.

Figure 5D:
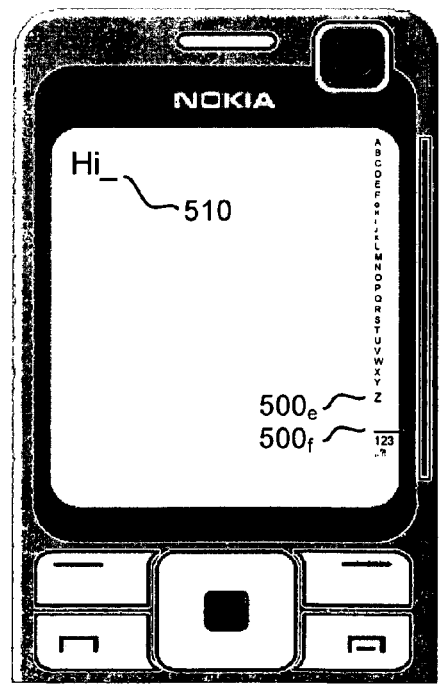

In FIG. 5d, the user lifts his thumb and moves it to the bottom of the touch rail 220 to access the space character "_" at $500_f$. The user is actually touching the sub area next to "Z" at $500_e$, but the transparent symbol prediction functionality finds "_" more likely than "Z", and therefore "_" is highlighted at $500_f$.

The user depresses the touch rail 220 slightly harder, and "_" is added to the text shown at 510.

Figure 5E:
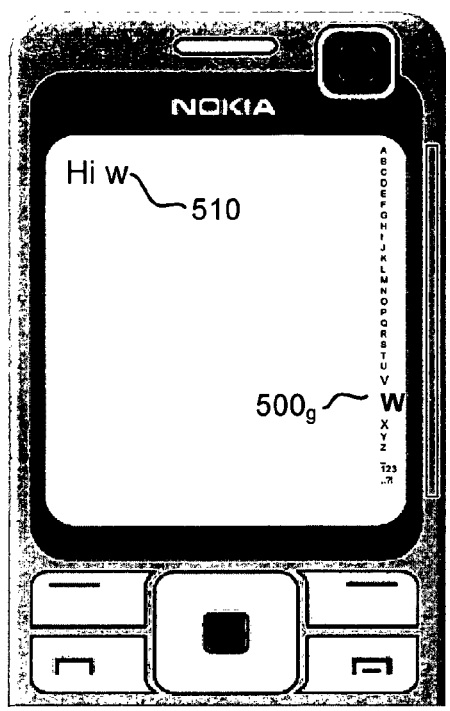

In FIG. 5e, maintaining his engagement with the touch rail 220, the user moves his thumb upwards, making "W" the highlighted character as seen at $500_g$. The user depresses the touch rail 220 slightly harder, and "W" is shown at 510 on the display 203.

Figure 5F:
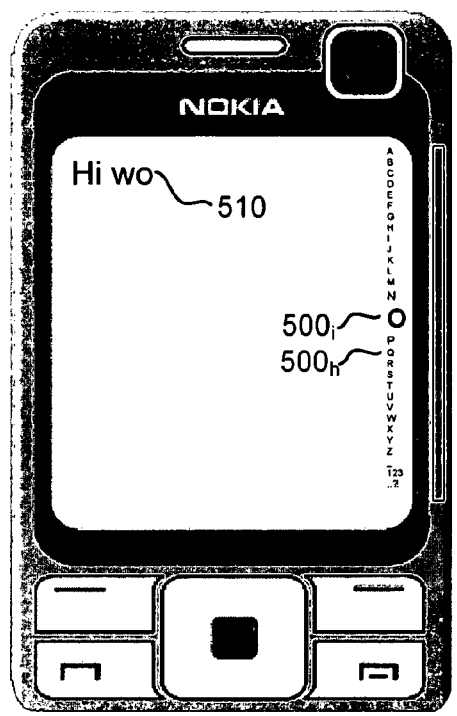

In FIG. 5f, the user lifts his thumb and moves it to the character "O" but accidentally hits the touch rail at "Q" ($500_h$). However, the transparent symbol prediction functionality regards "O" more likely than "P", "Q", "R" and "S" and therefore highlights "O", as intended and seen at $500_i$. The user depresses the touch rail 220 slightly harder, and "O" is shown at 510 on the display 203.

Figure 5G:
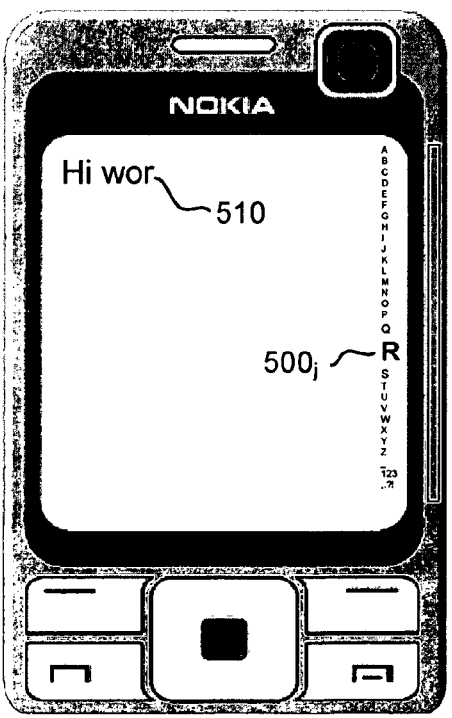

In FIG. 5g, maintaining his engagement with the touch rail 220, the user moves his thumb downwards, making "R" the highlighted character as seen at $500_j$. The user depresses the touch rail 220 slightly harder, and "R" is shown at 510 on the display 203.

Figure 5H:
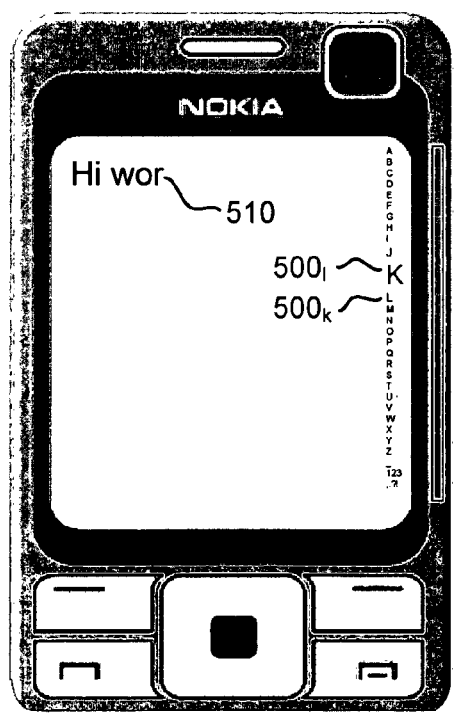

In FIG. 5h, the user lifts his thumb, moves it to the character "L" ($500_k$) and successfully hits this sub area of the touch rail 220. However, "K" is the more likely character given the previous three recently input characters, and therefore "K" is highlighted instead at $500_l$.

Figure 5I:
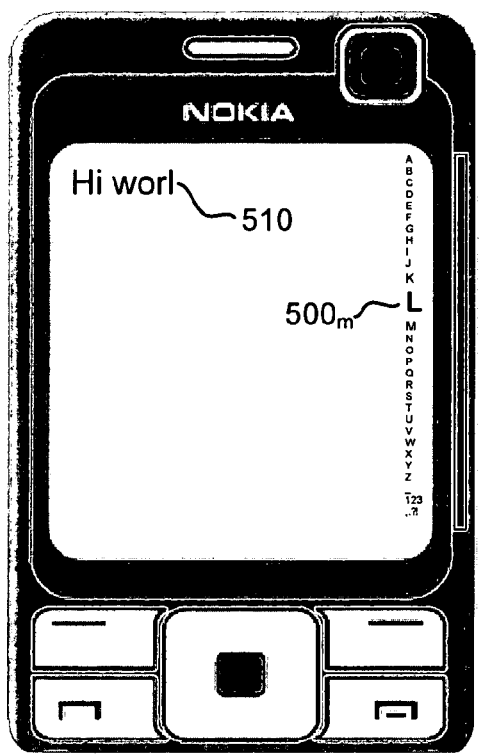

To correct this, in FIG. 5i, the user slides his thumb on the touch rail downwards, until "L" is highlighted at $500_m$. The user depresses the touch rail 220 slightly harder, and "L" is shown at 510 on the display 203.

Figure 5J:
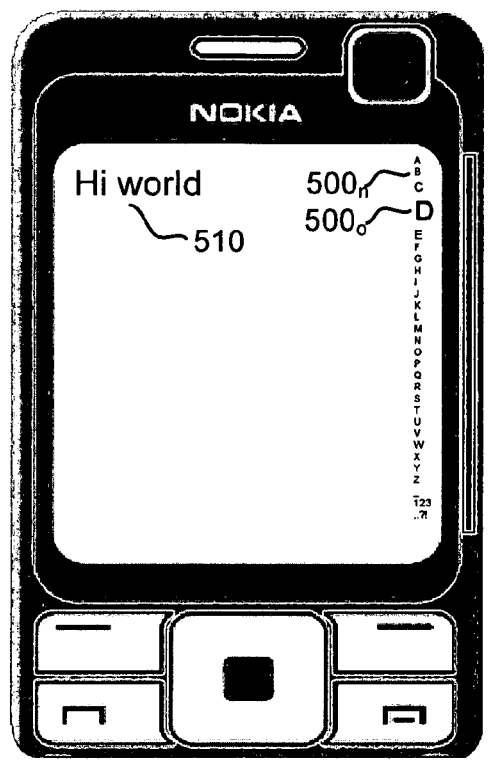

Finally, in FIG. 5j, the user lifts his thumb and attempts to hit the sub area of the touch rail 220 at "D" but accidentally selects "B" ($500_n$). Nevertheless, the symbol prediction functionality highlights "D" at $500_o$, since this is the most likely character given the previous input.

The invention has mainly been described above with reference to a few embodiments. However, as is readily appreciated by a person skilled in the art, other embodiments than the ones disclosed above are equally possible within the scope of the invention, as defined by the appended patent claims.

For instance, in one alternative embodiment, only a subset of the symbols in the symbol sequence are shown at a time on the display. Thus, if the symbol sequence involves the full alphabet from "A" to "Z", plus some control symbols, the processing device 300 may be adapted to show only a total of for instance nine symbols upon detected actuation of the touch rail—four preceding neighbor symbols, the particular symbol deemed to be associated with the actuation, and four succeeding neighbor symbols. This embodiment has an advantage in that it supports application of the inventive functionality also in a limited user interface having only a small-sized display.

What is claimed is:

1. An electronic apparatus having a user interface for symbol input, the apparatus comprising:
    a display;
    an input device having an elongated touch-sensitive sensor area and capable of detecting user actuations of a plurality of sensor positions along a main axis of said elongated touch-sensitive sensor area; and
    a processing device coupled to said display and said input device,
        wherein the processing device, in response to a user actuation of a current sensor position among said plurality of sensor positions of said input device, is configured to:
    determine, from said current sensor position, a current symbol position in a symbol sequence, and
        control said display to indicate a current symbol held by said current symbol position in said symbol sequence; and wherein
        the processing device is configured to control said display for presentment of said symbol sequence in a predetermined and fixed order, and to control said display to indicate said current symbol held by said current symbol position by marking it as available for selection; and
    wherein the processing device is configured to detect a first user actuation of a first sensor position of said input device, determine from the first sensor position a first symbol position holding a first symbol, and control the display to mark the first symbol as available for selection, and wherein the processing device is further configured to detect a second user actuation of said input device, determine from said first symbol position and said second user actuation a second symbol position holding a second symbol, and control the display to mark the second symbol as available for selection instead of the first symbol.

2. An electronic apparatus as defined in claim 1, further having an apparatus housing, wherein a display area of said display is provided at a surface of said apparatus housing adjacently to the elongated touch-sensitive sensor area of said input device.

3. An electronic apparatus as defined in 2, wherein said symbol sequence is presented near a border of said display area adjacently to and in alignment with the main axis of said elongated touch-sensitive sensor area, such that the sensor positions of the sensor area are aligned with respective ones of said symbol positions of the presented symbol sequence.

4. An electronic apparatus as defined in claim 2, wherein the elongated touch-sensitive sensor area of said input device is provided as a touch rail in or at said surface of said apparatus housing adjacent to said display and has a visual appearance which is indifferent from surrounding parts of said surface.

5. An electronic apparatus as defined in claim 1, wherein the input device is implemented by a touch-sensitive sensor selected from the group consisting of: a resistive touch-sensitive sensor, a capacitive touch-sensitive sensor, an acoustic wave sensor, an accelerometer sensor, an optical (e.g. infrared) sensor, an electromechanical sensor, an electromagnetic sensor, or any combination of the above.

6. An electronic apparatus as defined in claim 1, wherein the input device and the display are jointly implemented by a touch-sensitive display, said elongated touch-sensitive sensitive sensor area of the input device being implemented by a particular display sub area of the touch-sensitive display.

7. An electronic apparatus as defined in claim 1, wherein the processing device is further configured to detect the occurrence of a selective event on said touch-sensitive sensor area of the input device, and in response cause selection of said marked symbol as a current input symbol.

8. An electronic apparatus as defined in claim 7, aforesaid user actuation involving a certain force of actuation by the user onto said touch-sensitive sensor area, wherein the selective event is detected as a further user actuation of said touch-sensitive sensor area, the further user actuation involving a larger force of actuation than said certain force of actuation.

9. An electronic apparatus as defined in claim 1, wherein each sensor position among said plurality of sensor positions is associated with a respective symbol position in said symbol sequence and wherein the processing device is configured to determine said current symbol position from said current sensor position by choosing a symbol position with which said current sensor position is associated.

10. An electronic apparatus as defined in claim 1,
   wherein each sensor position among said plurality of sensor positions is associated with a respective symbol position in said symbol sequence, and
   wherein the processing device has access to symbol prediction functionality and is configured to determine said current symbol by:
      determining a candidate symbol held by a symbol position with which said current sensor position is associated;
      selecting a range of symbols from said symbol sequence, said range including said candidate symbol;
      determining a most probable next input symbol in said range of symbols by applying the symbol prediction functionality;
      and choosing said most probable next input symbol as said current symbol.

11. An electronic apparatus as defined in claim 10, wherein the symbol prediction functionality operates on at least one recent input symbol in consideration of a prefix or word based stochastic language model.

12. An electronic apparatus as defined in claim 1, wherein the first user actuation involves engaging with the touch-sensitive sensor area at said first sensor position, and wherein the second user actuation involves moving with maintained engagement along said main axis to a second sensor position from which said second symbol position is determined.

13. An electronic apparatus as defined in claim 12,
   wherein each sensor position among said plurality of sensor positions is associated with a respective symbol position in said symbol sequence, and
   wherein the processing device is provided with symbol prediction functionality and is configured to determine said second symbol by:
      determining a candidate symbol held by a symbol position with which said second sensor position is associated;
      selecting a range of symbols from said symbol sequence, said range including said candidate symbol;
      determining a most probable next input symbol in said range of symbols by applying the symbol prediction functionality;
      and choosing said most probable next input symbol as said second symbol.

14. An electronic apparatus as defined in claim 1, comprising a wireless telecommunication interface to a mobile telecommunications network.

15. A method for symbol input in an electronic apparatus having a display, the method comprising:
   providing an input device having an elongated touch-sensitive sensor area and capable of detecting user actuations of a plurality of sensor positions along a main axis of said elongated touch-sensitive sensor area;
   detecting a user actuation of a current sensor position among said plurality of sensor positions;
   determining, from said current sensor position, a current symbol position in a symbol sequence; and
   indicating on said display a current symbol held by said current symbol position in said symbol sequence;
   presenting said symbol sequence in a predetermined and fixed order, and marking said current symbol held by said current symbol position as available for selection; and
   detecting a first user actuation of a first sensor position of said input device, determining from the first sensor position a first symbol position holding a first symbol, and marking the first symbol as available for selection, and
   detecting a second user actuation of said input device, determining from said first symbol position and said second user actuation a second symbol position holding a second symbol, and marking the second symbol as available for selection instead of the first symbol.

16. An electronic apparatus for symbol input, the apparatus comprising:
   means for detecting user actuations of a plurality of sensor positions along a main axis of an elongated touch-sensitive sensor area;
   means for detecting a user actuation of a current sensor position among said plurality of sensor positions;
   means for determining, from said current sensor position, a current symbol position in a symbol sequence; and
   means for indicating a current symbol held by said current symbol position in said symbol sequence;
      means for presentment of said symbol sequence in a predetermined and fixed order, and to control said display to indicate said current symbol held by said current symbol position by marking it as available for selection;
   means for detecting a first user actuation of a first sensor position of said input device, determine from the first sensor position a first symbol position holding a first symbol, and control the display to mark the first symbol as available for selection, and
   detecting a second user actuation of said input device, determine from said first symbol position and said second user actuation a second symbol position holding a second symbol, and control the display to mark the second symbol as available for selection instead of the first symbol.

17. A computer program product comprising machine-readable instructions which, when executed by a processor, perform the steps of:
   detecting a user actuation of a current sensor position among a plurality of sensor positions along a main axis of an elongated touch-sensitive sensor area of an input device;
   determining, from said current sensor position, a current symbol position in a symbol sequence; and
   indicating, on a display, a current symbol held by said current symbol position in aid symbol sequence;
      controlling said display for presentment of said symbol sequence in a predetermined and fixed order, and to controlling said display to indicate said current symbol held by said current symbol position by marking it as available for selection;

detecting a first user actuation of a first sensor position of said input device, determining from the first sensor position a first symbol position holding a first symbol, and controlling the display to mark the first symbol as available for selection, and detecting a second user actuation of said input device, determining from said first symbol position and said second user actuation a second symbol position holding a second symbol, and controlling the display to mark the second symbol as available for selection instead of the first symbol.

* * * * *

UNITED STATES PATENT AND TRADEMARK OFFICE
CERTIFICATE OF CORRECTION

| | | |
|---|---|---|
| PATENT NO. | : 7,556,204 B2 | Page 1 of 1 |
| APPLICATION NO. | : 11/406490 | |
| DATED | : July 7, 2009 | |
| INVENTOR(S) | : Niels Ebbe Jacobsen | |

It is certified that error appears in the above-identified patent and that said Letters Patent is hereby corrected as shown below:

Title Page 1, column 1, line 1, Assignee, delete "corproation" and insert --Corporation--, therefor.

Column 14, line 67, through Column 15, line 1, in Claim 16, after "touch-sensitive" delete "sensitive".

Column 16, line 65, in Claim 17, delete "aid" and insert --said--, therefor.

Signed and Sealed this

Thirty-first Day of August, 2010

David J. Kappos
*Director of the United States Patent and Trademark Office*